(12) United States Patent
Querejeta Andueza (10) Patent No.: US 11,054,047 B2
(45) Date of Patent: Jul. 6, 2021

(54) REGULATING VALVE FOR A GAS COOKING APPLIANCE AND GAS COOKING APPLIANCE INCORPORTATING SAID REGULATING VALVE

(71) Applicant: Copreci, S. Coop., Aretxabaleta (ES)

(72) Inventor: Felix Querejeta Andueza, Hendaye (FR)

(73) Assignee: COPRECI, S. COOP., Aretxabaleta (ES)

(*) Notice: Subject to any disclaimer, the term of this patent is extended or adjusted under 35 U.S.C. 154(b) by 60 days.

(21) Appl. No.: 16/039,942

(22) Filed: Jul. 19, 2018

(65) Prior Publication Data

US 2018/0320794 A1 Nov. 8, 2018

Related U.S. Application Data

(63) Continuation of application No. PCT/EP2017/054028, filed on Feb. 22, 2017.

(30) Foreign Application Priority Data

Feb. 24, 2016 (EP) ..................................... 16382077

(51) Int. Cl.
*F16K 11/07* (2006.01)
*F23N 1/00* (2006.01)
(Continued)

(52) U.S. Cl.
CPC ............ *F16K 11/074* (2013.01); *F16K 3/085* (2013.01); *F16K 31/041* (2013.01); *F23K 5/147* (2013.01);
(Continued)

(58) Field of Classification Search
CPC .......... F16K 11/074; F16K 3/085; F16K 3/08; F16K 5/10; F16K 5/103; F16K 5/106;
(Continued)

(56) References Cited

U.S. PATENT DOCUMENTS

| 2,780,833 A | 2/1957 | Braunlich |
| 3,014,489 A | 12/1961 | Lamp et al. |

(Continued)

FOREIGN PATENT DOCUMENTS

| EP | 2908053 A1 | 8/2015 |
| JP | S558575 A | 1/1980 |
| WO | 2013080116 A2 | 6/2013 |

OTHER PUBLICATIONS

International Search Report and Written Opinion of the International Searching Authority in corresponding International Application No. PCT/EP2017/054028, dated May 15, 2017.
Extended European Search Report in corresponding European Application No. 16382077.2, dated Aug. 19, 2016.

*Primary Examiner* — Kelsey E Cary
(74) *Attorney, Agent, or Firm* — Edell, Shapiro & Finnan, LLC (57) ABSTRACT

Regulating valve for a gas cooking appliance, comprising a valve body with an inlet conduit and at least one outlet conduit, and a rotating disc arranged between the inlet conduit and the outlet conduit, comprising a plurality of connecting holes for regulating the gas flow, more than one connecting hole overlapping with an outlet hole of the outlet conduit, and the rotating disc comprising a main series of connecting holes increasing in size in the direction of increasing gas flow. There is an intercalated hole between successive holes of the main series and after each hole of the main series, the size of each intercalated hole being smaller than the size of the preceding contiguous hole of the main series.

20 Claims, 7 Drawing Sheets

(51) Int. Cl.
  *F23K 5/14* (2006.01)
  *F16K 11/074* (2006.01)
  *F16K 3/08* (2006.01)
  *F16K 31/04* (2006.01)

(52) U.S. Cl.
  CPC .... *F23N 1/007* (2013.01); *F23K 2900/05002* (2013.01); *F23N 2235/16* (2020.01); *F23N 2235/24* (2020.01); *F23N 2241/08* (2020.01)

(58) Field of Classification Search
  CPC ........... F23K 5/147; F23K 2900/05002; F23N 1/007; F23N 2241/08; F23N 2235/16; F23N 2235/24
  USPC ................................................. 251/206, 207
  See application file for complete search history.

(56) References Cited

U.S. PATENT DOCUMENTS

| | | |
|---|---|---|
| 3,589,399 A | 6/1971 | Vignes |
| 4,191,281 A | 3/1980 | Nishikawa et al. |
| 4,219,049 A | 8/1980 | Skelly |
| 4,643,215 A * | 2/1987 | Phlipot .................... F16K 3/08 137/15.01 |
| 5,402,821 A | 4/1995 | Harstad |
| 5,419,419 A | 5/1995 | Macpherson |
| 2004/0182456 A1 | 9/2004 | Rousselin |
| 2015/0377380 A1 | 12/2015 | Li |

\* cited by examiner

FIG. 9

REGULATING VALVE FOR A GAS COOKING APPLIANCE AND GAS COOKING APPLIANCE INCORPORTATING SAID REGULATING VALVE

CROSS-REFERENCE TO RELATED APPLICATIONS

This application relates to and claims the benefit and priority to International Application No. PCT/EP2017/054028, filed Feb. 22, 2017, which claims the benefit and priority to European Application No. EP16382077.2, filed Feb. 24, 2016.

TECHNICAL FIELD

The present invention relates to regulating valves for a gas cooking appliance and to gas cooking appliances incorporating said regulating valves.

BACKGROUND

Regulating valves for gas cooking appliances are known to comprise a rotating disc with a plurality of connecting holes, such that rotation of the rotating disc allows regulating the gas flow of the valve between an inlet conduit and an outlet conduit of the valve through the connecting holes.

U.S. Publication No. 2004/0182456A1 describes a gas flow regulating device comprising a body with an inlet conduit through which gas is supplied, an outlet conduit, an inner cavity in fluid communication with the inlet conduit, and a rotating disc arranged in the inner cavity of the body of the device. The rotating disc includes a plurality of connecting holes for regulating gas flow between the inner cavity and the outlet conduit by means of rotation of the rotating disc. The connecting holes overlap with an outlet hole of the outlet conduit, the rotating disc being movable along an angular path B comprising an intermediate zone in which in all the angular positions the outlet hole overlaps with more than one connecting hole of the rotating disc, and the rotating disc includes a main series of connecting holes increasing in size in the direction of increasing gas flow.

SUMMARY OF THE DISCLOSURE

A regulating valve is provided that according to one embodiment includes a valve body with an inlet conduit through which gas is supplied, at least one outlet conduit, an inner cavity in fluid communication with the inlet conduit, and a rotating disc arranged in the inner cavity of the body of the device. The rotating disc comprises a plurality of connecting holes for regulating gas flow between the inner cavity and the outlet conduit by means of rotation of the rotating disc, the connecting holes overlapping with an outlet hole of the outlet conduit. The rotating disc is movable along an angular path comprising an intermediate zone corresponding to the regulation of intermediate gas flow rates through the valve in which in all the angular positions of the rotating disc the outlet hole overlaps with more than one connecting hole of the rotating disc, and comprises a main series of connecting holes increasing in size in the direction of increasing gas flow.

The rotating disc of the regulating valve comprises between successive holes of the main series of connecting holes, and after each hole of the main series, an intercalated hole, the size of each intercalated hole being smaller than the size of the preceding contiguous hole of the main series.

Holes increasing in size in the direction of increasing gas flow are usually used in rotating discs of regulating valves of the prior art, which can give rise to surges in gas flow transition between discrete gas flow positions (the subsequent hole with which the outlet hole overlaps always has a size larger than the preceding hole with which it no longer overlaps). This translates into a non-linearity in gas flow between discrete gas flow regulating positions, and the user will feel that the gas appliance has poor quality and precision. In the rotating disc of the regulating valves disclosed herein, holes with smaller sizes are intercalated in the main series of connecting holes increasing in size, whereby more linear transitions of the gas flow are obtained, giving rise to a more linear regulation of the flow in both directions for increasing and reducing gas flow.

These and other advantages and features will become evident in view of the drawings and the detailed description.

DETAILED DESCRIPTION

Figure 1:
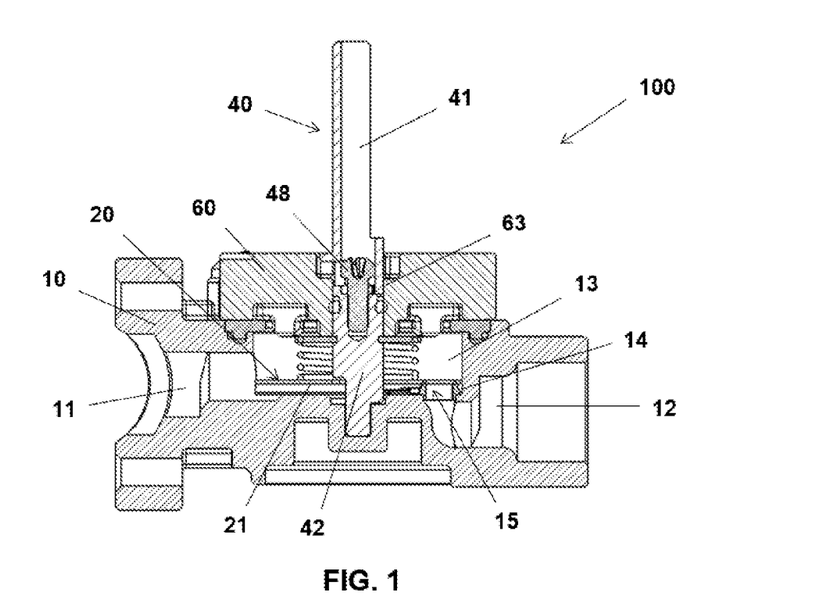
FIG. 1 shows a section view of a regulating valve according to one embodiment.
Figure 2:
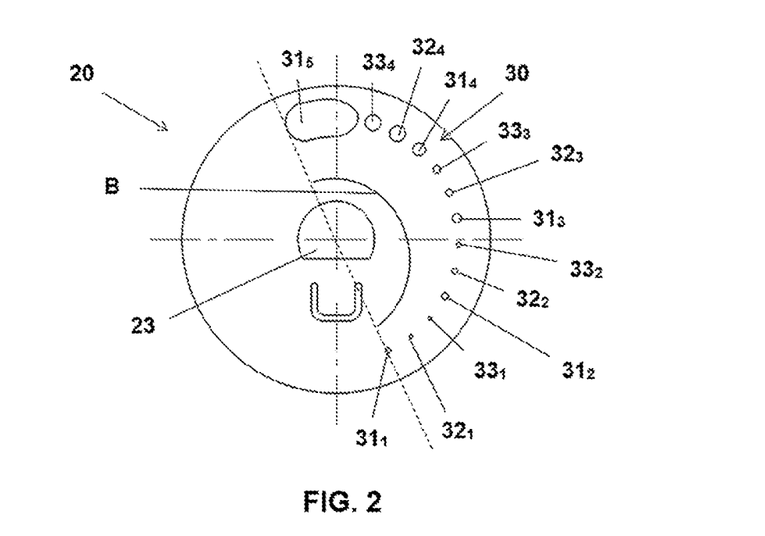
FIG. 2 shows a plan view of the rotating disc of the valve of FIG. 1.

FIG. 1 shows a section view of a regulating valve 100 of the according to one embodiment. FIG. 2 shows a plan view of the rotating disc 20 of the valve 100 of FIG. 1. The regulating valve 100 is intended for regulating gas flow to a burner of a gas cooking appliance, the valve 100 being in fluid communication with the burner.

The regulating valve 100 comprises a valve body 10 with an inlet conduit 11 through which gas is supplied and an outlet conduit 12 for the gas. The valve 100 comprises an inner cavity 13 which is in fluid communication with the inlet conduit 11, the inner cavity 13 comprising an outlet hole 15 in fluid communication with the outlet conduit 12. The valve 100 comprises a rotating disc 20 which in turn comprises a surface 21 which, as shown in FIG. 1, is the lower surface of the rotating disc 20, which is in contact with a contact surface 14 of the inner cavity 13 of the valve body 10. The inner cavity 13 of the valve 100 is formed in this embodiment of the valve 100 in a void of the valve body 10, a series of protuberances forming the contact surface 14 being arranged at the bottom of the void, the outlet hole 15 of the inner cavity 13 comprising an elastomeric seal which allows fluidly isolating the rotating disc 20 of the outlet conduit 12, in the contact between the surface 21 of the rotating disc 20 when it is supported in the outlet hole 15.

The rotating disc 20 is capable of rotating with respect to the contact surface 14 of the inner cavity 13, maintaining the leak-tightness between the surface 21 of the rotating disc 20 and the contact surface 14 of the inner cavity 13. The rotating disc 20 comprises a plurality of connecting holes 30 which allow regulating the gas flow between the inner cavity 13 and the outlet conduit 12 of the valve body 10 by means of the rotation of the rotating disc 20. This regulation of the gas flow takes place when the connecting holes 30 and the outlet hole 15 of the inner cavity 13 are arranged in fluidic communication. Furthermore, the regulating valve 100 comprises operating means 40 which is connected to the rotating disc 20 for rotating the rotating disc 20.

The rotating disc 20 is movable along an angular path comprising an intermediate zone in which in all the angular positions the outlet hole 15 overlaps with more than one connecting hole of the rotating disc 20. The rotating disc 20 comprises a main series $31_1, \ldots, 31_n$ of connecting holes 30 increasing in size in the direction of increasing gas flow, and comprises between successive holes of the main series $31_1, \ldots, 31_n$ and after each hole of the main series $31_1, \ldots, 31_n$ an intercalated hole, the size of each intercalated hole being smaller than the size of the preceding contiguous hole of the main series $31_1, \ldots, 31_n$. Linear regulation of the gas flow along the entire angular path is thereby obtained.

This distribution of the connecting holes 30 allows easily adapting the valve 100 to different types of combustible gases without changing or modifying the rotating disc 20, but by simply repositioning it with respect to a reference position which is usually the minimum position. In fact, the valve 100 shown in the drawings is adapted for supplying different types of gases.

According to one embodiment the valve 100 allows supplying a first type of gas such as natural gas NG, and a second and third type of gas both derived from liquefied gas LPG, such as propane and butane, respectively. To adapt the valve 100 to the corresponding gas supply, as will be explained in detail below, the rotating disc 20 is arranged in a different angular position for each supply gas when the operating means 40 is arranged in a reference position of the valve 100. In this embodiment of the regulating valve 100, the operating means 40 comprises an actuating shaft 41 that can be rotated along an angular path, defining the angular path of the rotating disc 20. The rotating disc 20 is attached to a coupling shaft 42 which is coupled to the actuating shaft 41 of the operating means 40 by attachment means 48, such as a screw.

The angular path of the rotating disc 20 corresponds with the path of the gas flow leaving the valve 100, between an OFF position, which corresponds with a position without any gas flow, and a minimum gas flow position MIN, a maximum gas flow MAX and an intermediate gas flow INTERMEDIATE being located between these ends. The regulating valve comprises a cover 60 which is attached to the valve body 10 in this embodiment by means of two screws, an inner cavity 13 being formed inside the valve 100. The cover 60 comprises a hole 63 going through it, the coupling shaft 42 of the rotating disc 20 being housed in the hole 63 of the cover 60, going through it. The rotating disc 20 is previously coupled to the coupling shaft 42, a flat area of the outer surface of the coupling shaft 42 being coupled in a semicircular hole 23 of the rotating disc 20. Therefore, when assembling the rotating disc 20 in the valve 100, the rotating disc 20 is housed in the inner cavity 13, the surface 21 thereof being supported on the contact surface 14 of the inner cavity 13, and the coupling shaft 42 is housed in the hole 63 of the cover 60, an upper end of the coupling shaft 42 being shown on the outside of the valve 100, through the hole 63 of the cover 60.

The gas flow regulation in the regulating valve 100 is regulated, as already explained, by means of the connecting holes 30 overlapping with the outlet hole 15 of the outlet conduit 12. The rotating disc 20 is movable along an angular path comprising an intermediate zone in which in all the angular positions the outlet hole 15 overlaps with more than one connecting hole of the rotating disc 20, as will be described below. In this embodiment, the rotating disc 20 comprises a main series $31_1$-$31_5$ of five connecting holes increasing in size in the direction of increasing gas flow in the angular path, arranged in an angular path B which is smaller than or the same as the angular path of the rotating disc 20 of the regulating valve 100. The first four holes of the main series $31_1$-$31_5$ are circular, and the fifth hole is elongated and has a much larger dimension than the preceding ones. The rotating disc 20 comprises between successive holes of the main series $31_1$-$31_5$, and after each hole of the main series $31_1$-$31_5$, an intercalated hole, the size of each intercalated hole being smaller than the size of the preceding contiguous hole of the main series $31_1$-$31_5$. These intercalated holes form a second series $32_1$-$32_4$ of four connecting holes also increasing in size in the direction of increasing gas flow.

In embodiment shown in the figures, the rotating disc 20 of the regulating valve 100 comprises a second intercalated hole between each intercalated hole of the second series $32_1$-$32_4$ of connecting holes and the subsequent hole of the main series $31_1$-$31_5$, the size of each second intercalated hole being larger than the size of the preceding contiguous intercalated hole of the second series $32_1$-$32_4$. These second intercalated holes form a third series $33_1$-$33_4$ of four connecting holes increasing in size in the direction of increasing gas flow. A total of thirteen connecting holes are therefore defined in this embodiment of the rotating disc 20 of the regulating valve 100, this number of holes being able to vary depending on the capacity of the regulating valve 100. The higher the capability, the larger the dimension of the valve will be, the larger the dimension of the rotating disc will be, and the larger the number of connecting holes there will be.

Figure 9:
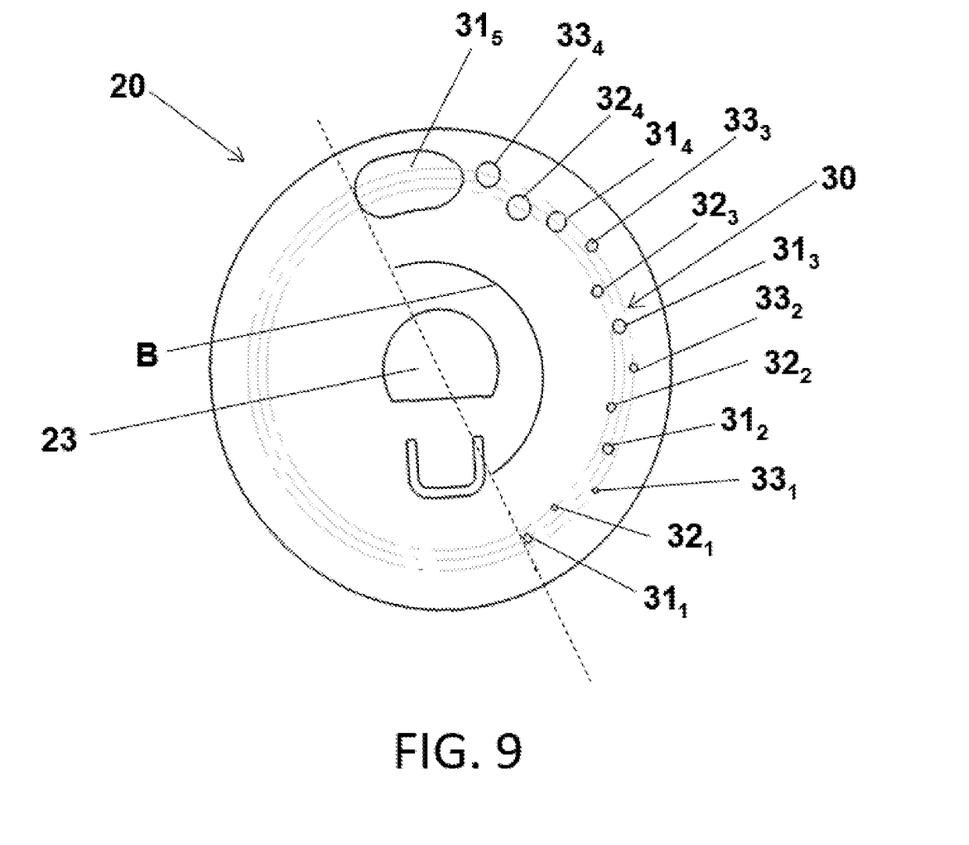
FIG. 9 shows a plan view of a rotating disc according to another embodiment.

In this embodiment of the regulating valve 100, the connecting holes of the rotating disc 20 of the main series $31_1$-$31_5$, of the second series $32_1$-$32_4$, and of the third series $33_1$-$33_4$ are arranged in one and the same radial position in the angular path B, such that they form a single row. Other arrangements of the connecting holes 30 are possible, for example, with each series of connecting holes 30 arranged in a different radial position, such that each series forms a different row as shown in FIG. 9, or with two of the series arranged in one and the same radial position and the remaining series arranged in another different radial position, always defining between all the series of connecting holes 30 an angular path which is the same as or smaller than the angular path of the rotating disc 20 of the regulating valve 100.

This embodiment of the valve 100 is adapted for supplying a first type of gas such as natural gas, a second type of gas such as propane, and a third type of gas such as butane, and the rotating disc 20 is arranged in a different angular position for each supply gas for adapting to the corresponding gas supply when the operating means 40 is arranged in a reference position of the valve 100. FIGS. 3A-D show a plan view of the rotating disc 20 of the valve 100 of FIG. 1 adapted for butane gas, the valve 100 being arranged in MIN (FIG. 3A), INTERMEDIATE (FIG. 3B), MAX (FIG. 3C) and OFF (FIG. 3D) gas flow regulating positions. FIGS. 4A-D show a plan view of the rotating disc 20 of the valve 100 of FIG. 1 adapted for propane gas, the valve also being arranged in MIN (FIG. 4A), INTERMEDIATE (FIG. 4B), MAX (FIG. 4C) and OFF (FIG. 4D) gas flow regulating positions, and FIGS. 5A-D show a plan view of the rotating disc 20 of the valve 100 of FIG. 1 adapted for natural gas, the valve being arranged in MIN (FIG. 5A), INTERMEDIATE (FIG. 5B), MAX (FIG. 5C) and OFF (FIG. 5D) gas flow regulating positions.

Figure 3A:
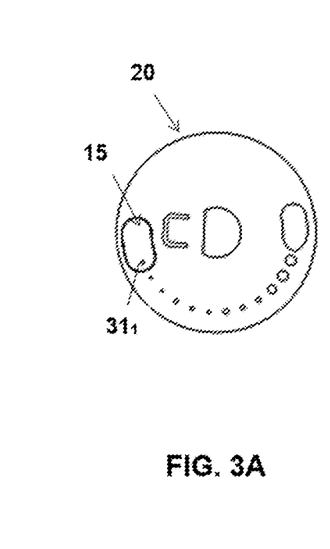
FIGS. 3A-D show a plan view of the rotating disc of the valve of FIG. 1 adapted for butane gas, the valve being arranged in MIN, INTERMEDIATE, MAX and OFF gas flow regulating positions.
Figure 3B:
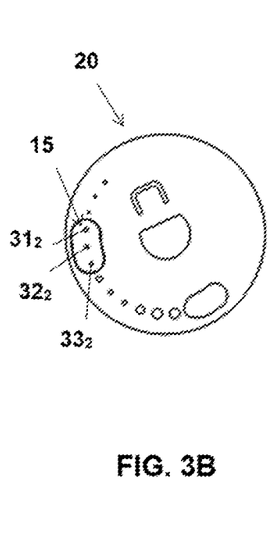

As explained, the rotating disc 20 is movable along an angular path comprising an intermediate zone in which in all the angular positions the outlet hole 15 overlaps with more than one connecting hole 30 of the rotating disc 20. In this embodiment of the regulating valve 100, in which there are three intercalated series $31_1$-$31_5$, $32_1$-$32_4$ and $33_1$-$33_4$, there are at least three connecting holes overlapping with the outlet hole 15 in the intermediate zone at all times, and as the overlap with respect to a connecting hole becomes less, the outlet hole 15 gradually overlaps with a new connecting hole, obtaining a linear regulation as a result of the size ratio existing between successive holes. As shown in FIG. 3B for butane gas, in FIG. 4B for propane gas, and in FIG. 5B for natural gas, there are discrete positions in which the intermediate gas flow INTERMEDIATE is obtained by three consecutive connecting holes, corresponding to each of the main series $31_1$-$31_5$, second series $32_1$-$32_4$, and third series $33_1$-$33_4$ of connecting holes, overlapping with the outlet hole 15. The transition between successive discrete positions in which the outlet hole 15 overlaps with three complete holes is carried out by means of progressively overlapping with hole arranged thereafter in the direction of rotation and progressively lessening the overlap with the first of the three holes.

Figure 4A:
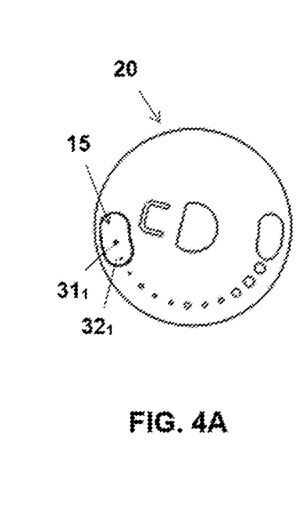
FIGS. 4A-D show a plan view of the rotating disc of the valve of FIG. 1 adapted for propane gas, the valve being arranged in MIN, INTERMEDIATE, MAX and OFF gas flow regulating positions.
Figure 4B:
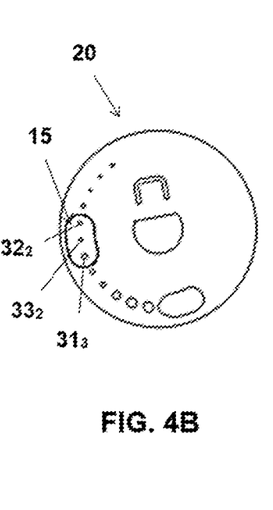
Figure 5A:
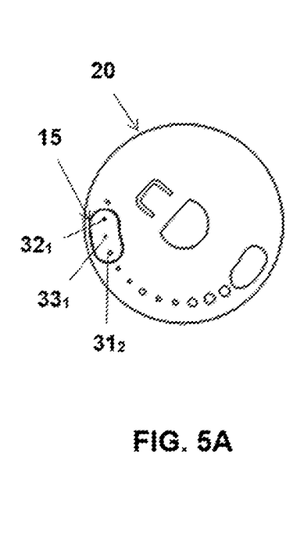
FIGS. 5A-D show a plan view of the rotating disc of the valve of FIG. 1 adapted for natural gas, the valve being arranged in MIN, INTERMEDIATE, MAX and OFF gas flow regulating positions.
Figure 5B:
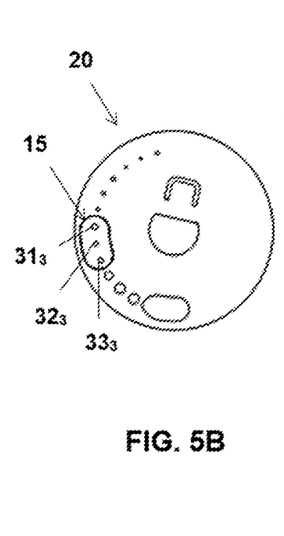

There is an initial zone in the angular path of the rotating disc 20 in which a minimum gas flow position MIN for each of the supply gases is defined. Since the rotating disc 20 is arranged in a different angular position for each type of gas, in the case of butane gas and as shown in FIG. 3A, the outlet hole 15 only overlaps with the first hole $31_1$ of the main series $31_1$-$31_5$. In the case of propane gas and as shown in FIG. 4A, the outlet hole 15 overlaps with the first hole $31_1$ of the main series $31_1$-$31_5$ and with the intercalated hole $32_1$ of the second series $32_1$-$32_4$ arranged after the first hole $31_1$. In the case of natural gas and as shown in FIG. 5A, the outlet hole 15 overlaps with the intercalated hole $32_1$ of the second series $32_1$-$32_4$ arranged after the first hole $31_1$ of the main series $31_1$-$31_5$, with the first of the second intercalated holes $33_1$ of the third series $33_1$-$33_4$, and with the second hole $31_2$ of the main series $31_1$-$31_5$.

Figure 3C:
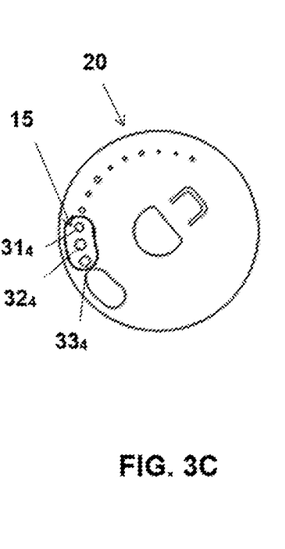
Figure 4C:
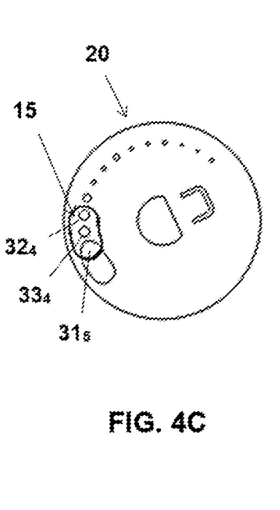
Figure 5C:
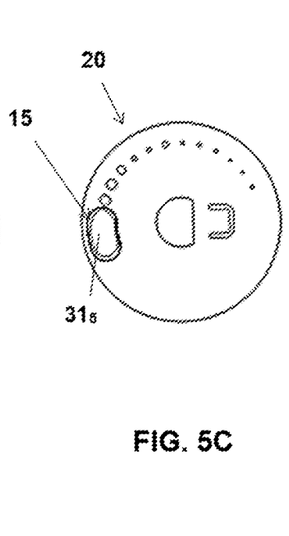

After the intermediate zone of the angular path of the rotating disc 20, in the direction of increasing gas flow, there is an end zone for gas flow regulation in which a maximum gas flow position MAX for each of the supply gases is defined. In the case of butane gas and as shown in FIG. 3C, the outlet hole 15 overlaps with three consecutive connecting holes, corresponding to the fourth hole $31_4$ of the main series $31_1$-$31_5$, to the fourth one of the intercalated holes $32_4$ of the second series $32_1$-$32_4$, and to the fourth one of the second intercalated holes $33_4$ of the third series $33_1$-$33_4$ of connecting holes. In the case of propane gas and as shown in FIG. 4C, the outlet hole 15 overlaps with the fourth one of the intercalated holes $32_4$ of the second series $32_1$-$32_4$, with the fourth one of the second intercalated holes $33_4$ of the third series 331-334, and partially overlaps with the fifth hole $31_5$ of the main series $31_1$-$31_5$. In the case of natural gas and as shown in FIG. 5C, the outlet hole 15 only overlaps with the fifth hole $31_5$ of the main series $31_1$-$31_5$.

Figure 3D:
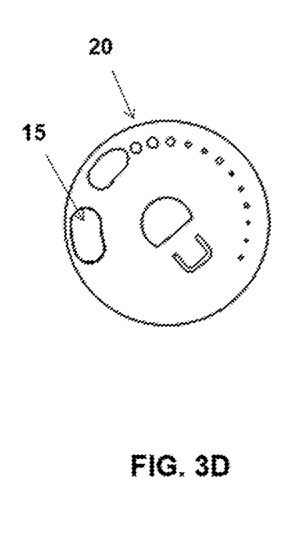
Figure 4D:
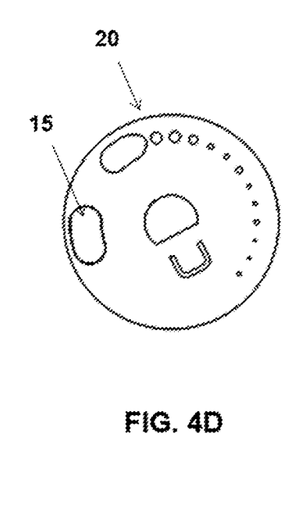
Figure 5D:
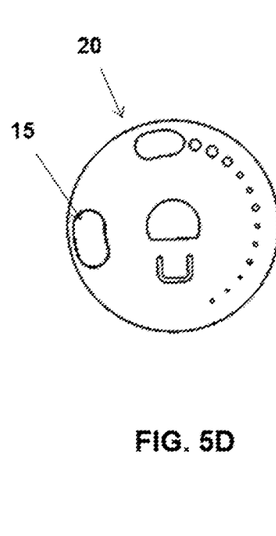

Furthermore, the angular path of the rotating disc 20 comprises at an end opposite the minimum gas flow position MIN, an OFF position without any gas flow, in which the outlet hole 15 does not overlap with any of the connecting holes for all the supply gases, as shown in FIGS. 3D, 4D, and 5D.

Therefore, along the angular path of the rotating disc 20, between the minimum gas flow position MIN and the maximum gas flow position MAX, a series of discrete gas flow positions are defined by means of, in this embodiment of the regulating valve 100, three consecutive connecting holes overlapping with the outlet hole 15. The connecting holes are arranged along the angular path of the rotating disc 20, such that it allows defining a large number of discrete gas flow positions. Having more or less connecting holes will depend on the dimension of the rotating disc 20, and this dimension of the rotating disc 20 will in turn depend on the type of regulating valve and on the heat output of the burner fed by the valve.

Figure 6:
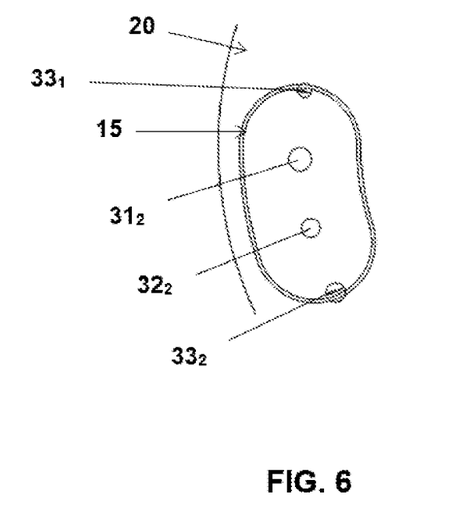
FIG. 6 shows a detailed view of the rotating disc of the valve of FIG. 1 with an overlap position of the connecting holes with respect to the outlet hole of the inner cavity of the valve when the gas flow is changed.

FIG. 6 shows a detailed view of the rotating disc 20 of the valve 100 of FIG. 1, with the connecting holes in an overlap position with respect to the outlet hole 15 of the inner cavity 13 of the valve 100 when the gas flow is changed. When the rotating disc 20, and therefore the regulating valve 100, is in a discrete gas flow position, for example an intermediate gas flow position INTERMEDIATE with a butane gas supply, holes $31_2$, $32_2$, $33_2$ overlap with the outlet hole 15. If the rotating disc 20 is rotated in the direction for reducing the gas flow to the subsequent discrete position in which it will overlap with the connecting holes $33_1$, $31_2$, $32_2$, it will go through an intermediate transition phase in which the connecting hole $33_2$ is moving away from overlapping with the outlet hole 15, and at the same time the connecting hole $33_1$ is starting to overlap with the outlet hole 15. Linearity and progressiveness of the outlet gas flow in the regulating valve 100 is thereby obtained since, for example, in the example described above the hole $33_2$ that moves away from the overlap has a size larger than hole $33_1$ that starts to overlap, and the difference in gas flow between discrete positions occurs temporarily in a linear and progressive manner, one hole starting the overlap and another hole moving away from the overlap at the same time, without sudden flow surges.

Figure 7:
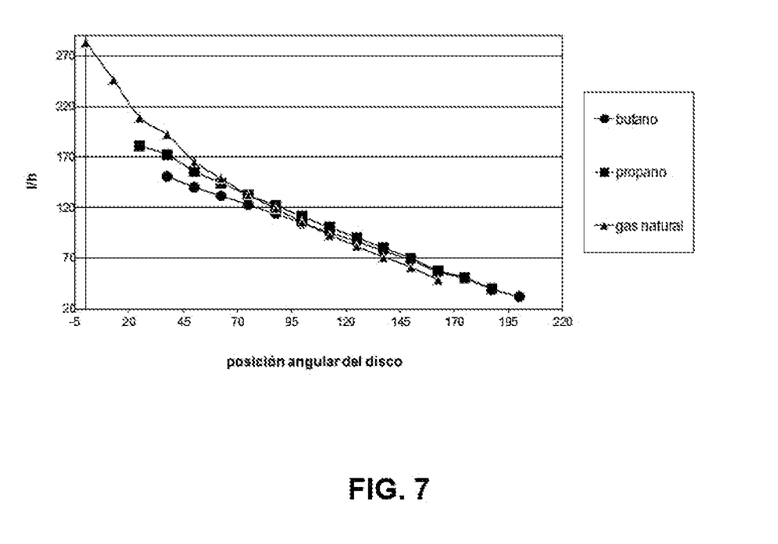
FIG. 7 shows a diagram linking the gas flow rate regulated by the rotating disc of the valve of FIG. 1 for butane, propane and natural gases, with respect to the change in the angular position of the rotating disc.

This progressiveness and linearity of the gas flow leaving the regulating valve 100 is reproduced for the different supply gases, and this is done without replacing or modifying the rotating disc 20. FIG. 7 shows a diagram linking the gas flow rate in liters/hour regulated by the rotating disc 20 of the valve 100 of FIG. 1 for butane, propane and natural gases, with respect to the change in angular position of the rotating disc 20 caused by rotation of the actuating shaft 41 of the regulating valve 100, and it can be seen in the diagram that linearity and progressiveness is the response of the valve 100 for the different discrete gas flow positions in their different angular positions.

Although discrete connecting holes 30 are shown in the drawings, the invention also covers those embodiments in which the holes can be attached to one another forming a single connection opening, or even those embodiments in which some holes can be attached to one another and others cannot.

Figure 8:
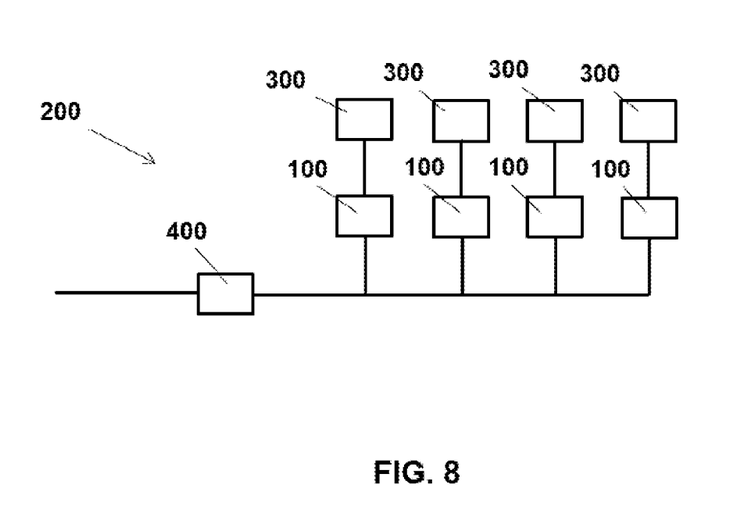
FIG. 8 shows a schematic view of a gas appliance with a plurality of regulating valves.

The invention also relates to a gas cooking appliance 200 incorporating at least one regulating valve 100. By way of illustration, FIG. 8 shows a schematic depiction of a gas cooking appliance 200 with four burners 300, each with its respective regulating valve 100. The gas cooking appliance 200 of FIG. 8 also comprises an ON-OFF cutoff valve 400 at the gas supply inlet. Although in this embodiment the regulating valves 100 are manually operated, in other embodiments, not shown in the drawings, the regulating valves 100 can be controlled by a control device, or they can be controlled both by a control device and manually.

The gas cooking appliance can be, for example, a gas cooktop, a gas cooker, a gas oven or a grill.

The following clauses disclose in an unlimited way additional implementations, with each clause and combination of clauses representing a different implementation.

Clause 1: Regulating valve for a gas cooking appliance, comprising a valve body (10) with an inlet conduit (11) through which gas is supplied, at least one outlet conduit (12), an inner cavity (13) in fluid communication with the inlet conduit (11), and a rotating disc (20) arranged in the inner cavity (13) of the valve body (10), the rotating disc (20) comprising a plurality of connecting holes (30) for regulating gas flow between the inner cavity (13) and the outlet conduit (12) by means of rotation of the rotating disc (20), the connecting holes (30) overlapping with an outlet hole (15) of the outlet conduit (12), the rotating disc (20) being movable along an angular path comprising an intermediate zone in which in all the angular positions the outlet hole (15) overlaps with more than one connecting hole of the rotating disc (20), and the rotating disc (20) comprising a main series $31_1, \ldots, 31_n$) of connecting holes (30) increasing in size in the direction of increasing gas flow, the rotating disc (20) comprises between successive holes of the main series ($31_1, \ldots, 31_n$) and after each hole of said main series ($31_1, \ldots, 31_n$) an intercalated hole, the size of each intercalated hole being smaller than the size of the preceding contiguous hole of the main series ($31_1, \ldots, 31_n$).

Clause 2: Regulating valve according to clause 1, wherein the intercalated holes form a second series ($32_1, \ldots, 32_n$) increasing in size in the direction of increasing gas flow.

Clause 3: Regulating valve according to clause 1 or 2, wherein the rotating disc (20) comprises a second intercalated hole between each intercalated hole and the subsequent hole of the main series ($31_1, \ldots, 31_n$), the size of each second intercalated hole being larger than the size of the preceding contiguous intercalated hole.

Clause 4: Regulating valve according to clause 3, wherein the second intercalated holes form a third series ($33_1, \ldots, 33_n$) increasing in size in the direction of increasing gas flow.

Clause 5: Regulating valve according to any of the preceding clauses, wherein the connecting holes are arranged in one and the same radial position, such that they form a single row.

Clause 6: Regulating valve according to any of clauses 1 to 4, wherein each series of connecting holes is arranged in a different radial position, such that each series forms a different row.

Clause 7: Regulating valve according to any of the clauses, wherein the angular path of the rotating disc (20) comprises an initial zone in which there is a minimum gas position in which the outlet hole (15) only overlaps with the first hole ($31_1$) of the main series ($31_1, \ldots, 31_n$).

Clause 8: Regulating valve according to clause 7, wherein there is a second position in the initial zone corresponding with a minimum position for a second type of gas, the outlet hole (15) overlapping in that position with the first hole ($31_1$) of the main series ($31_1, \ldots, 31_n$) and with the intercalated hole arranged after said first hole ($31_1$).

Clause 9: Regulating valve according to clause 8, wherein there is a third position in the initial zone corresponding with a minimum position for a third type of gas, the outlet hole (15) overlapping in that position with the intercalated hole arranged after the first hole ($31_1$) of the main series ($31_1, \ldots, 31_n$) and with at least the subsequent hole.

Clause 10: Regulating valve according to clause 9, wherein the angular path of the rotating disc (20) comprises an end zone in which there is a maximum gas flow position for the third type of gas, in which the outlet hole (15) only overlaps with the last hole ($31_n$) of the main series ($31_1, \ldots, 31_n$).

Clause 11: Gas cooking appliance comprising at least one gas regulating valve (100) according to any of the preceding clauses

What is claimed is:

1. A regulating valve for a gas cooking appliance, the regulating valve comprising:
a valve body with an inlet conduit through which gas is supplied, an outlet conduit and an inner cavity in fluid communication with the inlet conduit, the valve body including an internal through hole that fluidly communicates the inner cavity with the outlet conduit:
a rotating disc arranged in the inner cavity of the valve body, the rotating disc including a first plurality of connecting holes arranged in an angular path and configured to regulate a plurality of intermediate gas flow rates through the regulating valve, the rotating disc rotatable between a plurality of angular positions corresponding to the plurality of intermediates flow rates to cause a positioning of at least three of the first plurality of connecting holes to overlap with the inner through hole of the valve body to regulate the plurality of intermediate gas flow rates between the inner cavity and the outlet conduit, the first plurality of connecting holes including a main series of connecting holes consecutively arranged in order of increasing size along the angular path in a direction corresponding to an increase in gas flow, the first plurality of connecting holes further including a plurality of first intercalated holes with one of the first intercalated holes being positioned between pairs of the main series of connecting holes, each of the pairs of the main series of connecting holes comprising successive first and second holes, the first hole preceding the second hole and being smaller in size than the second hole, each of the first intercalating holes having a size that is smaller than the nearest preceding first hole in the pairs of the main series of connecting holes, the rotating disc includes an off position wherein none of the first plurality of connecting holes overlap with the inner through hole of the valve body, the first plurality of connecting holes further comprising a plurality of second intercalated holes with one of the second intercalated holes also being positioned between the pairs of the main series of connecting holes, the plurality of angular positions corresponding to the plurality of intermediates flow rates including a first intermediate gas flow position and a second intermediate gas flow position, the rotating disc rotatable to a transitional position between the first and second intermediate gas flow positions wherein one of each of the main series of connecting holes and one of the first intercalated holes fully overlaps with the inner through hole of the valve body and two of the plurality of second intercalating holes only partially overlap with the inner through hole of the valve body.

2. The regulating valve according to claim 1, wherein the plurality of first intercalated holes are consecutively arranged in order of increasing size along the angular path in the direction corresponding to the increase in gas flow.

3. The regulating valve according to claim 1, wherein the plurality of second intercalated holes are consecutively arranged in order of increasing size along the angular path in the direction corresponding to the increase in gas flow.

4. The regulating valve according to claim 3, wherein each of the second intercalated holes has a size that is larger than the size of the nearest preceding first intercalated hole.

5. The regulating valve according to claim 1, wherein each of the second intercalated holes has a size that is larger than the size of the nearest preceding first intercalated hole.

6. The regulating valve according to claim 1, wherein all of the first plurality of connecting holes are arranged along a first circumferential line on the rotating disc.

7. The regulating valve according to claim 1, wherein each of the main series of connecting holes is arranged along a first circumferential line on the rotating disc and each of the plurality of first intercalating holes is arranged along a second circumferential line on the rotating disc, the second circumferential line being different than the first circumferential line.

8. The regulating valve according to claim 1, wherein all of the first plurality of connecting holes are arranged along a same circumferential line on the rotating disc.

9. The regulating valve according to claim 1, wherein each of the main series of connecting holes is arranged along a first circumferential line on the rotating disc, each of the plurality of first intercalated holes is arranged along a second circumferential line on the rotating disc, the second circumferential line being different than the first circumferential line, and each of the plurality of second intercalated holes is arranged along a third circumferential line on the rotating disc, the third circumferential line being different than each of the first circumferential line and second circumferential line.

10. The regulating valve according to claim 1, wherein the rotating disc includes a first minimum gas flow rate position for a first gas wherein only a first of the main series of connecting holes in the angular path overlaps with the inner through hole of the valve body, the first of the main series of connecting holes being smaller than the remainder of the main series of connecting holes.

11. The regulating valve according to claim 10, wherein the rotating disc includes a second minimum gas flow rate position for a second gas different than the first gas, wherein only the first of the main series of connecting holes in the angular path and a first of the first intercalated holes in the angular path overlap with the inner through hole of the valve body.

12. The regulatory valve according to claim 11, wherein the first gas is butane gas and the second gas is propane gas.

13. The regulatory valve according to claim 11, wherein the rotating disc is configured to assume a first angular position in the inner cavity corresponding to the regulation of the first gas and a second angular position in the inner cavity corresponding to the regulation of the second gas, the second angular position being different than the first angular position.

14. The regulatory valve according to claim 10, wherein the first gas is butane gas.

15. The regulating valve according to claim 1, wherein the rotating disc includes a first minimum gas flow rate position for a first gas wherein only a first of the main series of connecting holes in the angular path overlaps with the inner through hole of the valve body, the first of the main series of connecting holes being smaller than the remainder of the main series of connecting holes.

16. The regulating valve according to claim 15, wherein the rotating disc includes a second minimum gas flow rate position for a second gas different than the first gas, wherein only the first of the main series of connecting holes in the angular path and a first of the first intercalated holes in the angular path overlap with the inner through hole of the valve body.

17. The regulating valve according to claim 16, wherein the rotating disc includes a third minimum gas flow rate position for a third gas different than the first gas and the second gas, wherein only the first of the main series of connecting holes in the angular path, the first of the first intercalated holes in the angular path and a first of the second intercalated holes in the angular path overlap with the inner through hole of the valve body, the first of the second intercalated holes being smaller than the remainder of the second intercalated holes.

18. The regulatory valve according to claim 17, wherein the first gas is butane gas, the second gas is propane gas and the third gas is natural gas.

19. The regulatory valve according to claim 17, wherein the rotating disc is configured to assume a first angular position in the inner cavity corresponding to the regulation of the first gas, a second angular position in the inner cavity corresponding to the regulation of the second gas and a third angular position in the inner cavity corresponding to the regulation of the third gas, the first, second and third angular positions being different from one another.

20. The regulating valve according to claim 17, wherein the rotating disc includes a second plurality of connecting holes arranged in an angular path and configured to regulate a maximum gas flow rate through the regulating valve, the second plurality of connecting holes including a largest connecting hole that is larger than any the remainder of the first and second plurality of connecting holes, the rotating disc rotatable to a maximum flow rate position for the third gas wherein only the largest connecting hole overlaps with the inner through hole of the valve body.

* * * * *

UNITED STATES PATENT AND TRADEMARK OFFICE
CERTIFICATE OF CORRECTION

PATENT NO. : 11,054,047 B2
APPLICATION NO. : 16/039942
DATED : July 6, 2021
INVENTOR(S) : Querejeta Andueza It is certified that error appears in the above-identified patent and that said Letters Patent is hereby corrected as shown below:

On the Title Page

Column 1, Item (54) and in the Specification, Column 1, Lines 1-4, Title of the Invention delete "REGULATING VALVE FOR A GAS COOKING APPLIANCE AND GAS COOKING APPLIANCE INCORPORTATING SAID REGULATING VALVE" and insert --REGULATING VALVE FOR A GAS COOKING APPLIANCE AND GAS COOKING APPLIANCE INCORPORATING SAID REGULATING VALVE--.

Signed and Sealed this
Nineteenth Day of September, 2023

Katherine Kelly Vidal
*Director of the United States Patent and Trademark Office*